United States Patent
Robinson et al.

(10) Patent No.: US 6,942,787 B2
(45) Date of Patent: *Sep. 13, 2005

(54) FILTER MODULE WITH PRESSURE REGULATOR

(75) Inventors: Barry S. Robinson, Williamsburg, VA (US); James A. Wynn, Jr., Virginia Beach, VA (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/323,642

(22) Filed: Dec. 20, 2002

(65) Prior Publication Data

US 2004/0118756 A1 Jun. 24, 2004

(51) Int. Cl.[7] .................... F02M 41/00; F02M 37/04
(52) U.S. Cl. ................... 210/97; 210/137; 210/167; 123/457; 123/514; 137/510
(58) Field of Search ............... 210/90, 171, 137, 210/167, 97, 416.4; 123/446, 457, 514, 463; 137/510

(56) References Cited

U.S. PATENT DOCUMENTS

| | | | | |
|---|---|---|---|---|
| 5,018,500 A | * | 5/1991 | Triolo et al. ............... | 123/463 |
| 5,429,094 A | * | 7/1995 | Akiba et al. ............... | 123/463 |
| 5,458,104 A | | 10/1995 | Tuckey | |
| 5,785,080 A | | 7/1998 | Herbst | |
| 6,016,831 A | | 1/2000 | Bueser et al. | |
| 6,161,574 A | | 12/2000 | Gerhard et al. | |
| 6,581,631 B2 | * | 6/2003 | Tomczak et al. ............ | 137/510 |
| 2003/0226546 A1 | * | 12/2003 | McIntyre et al. ........... | 123/463 |

FOREIGN PATENT DOCUMENTS

JP          09042089 A  *  2/1997  .......... F02M/37/00

* cited by examiner

Primary Examiner—Terry K. Cecil

(57) ABSTRACT

A filter module for an automotive fuel supply system includes a housing, a filter mounted in the housing, a pressure regulator conduit mounted in the housing, and a pressure regulator. The housing includes a module inlet and a module outlet. The filter is in fluid communication with the module inlet and the module outlet. The pressure regulator conduit includes a regulator inlet in fluid communication with the filter, regulator outlet, and a receptacle in fluid communication with the regulator inlet and the regulator outlet. The pressure regulator extends into the void between the first surface of the receptacle and the second surface of the receptacle.

16 Claims, 3 Drawing Sheets

FILTER MODULE WITH PRESSURE REGULATOR

BACKGROUND OF THE INVENTION

It is believed that fuel pressure regulators relieve over-pressures in the fuel supply line extending between the fuel tank and the internal combustion engine. This fuel pressure regulation maintains the fuel pressure supplied to the fuel injectors at or below a prescribed value.

It is believed that over-pressures in the fuel supply line are caused by at least two sources. The first source includes fuel pressure pulses generated by the fuel pump sending pressurized fuel from the fuel tank to the fuel injectors. The second source includes unintended restrictions in the fuel supply line such as crimps or debris blockages.

SUMMARY OF THE INVENTION

There is provided a filter module for an automotive fuel supply system including a housing, a filter mounted in the housing, a pressure regulator conduit mounted in the housing, and a pressure regulator. The housing includes a module inlet and a module outlet. The filter is in fluid communication with the module inlet and the module outlet. The pressure regulator conduit includes a regulator inlet in fluid communication with the filter, regulator outlet, and a receptacle in fluid communication with the regulator inlet and the regulator outlet. The receptacle includes a first surface surrounding an axis, and a second surface surrounding the axis and the first surface to provide a void between the first surface and the second surface. The pressure regulator is mounted in the receptacle to selectively open fluid communication between the regulator inlet and the regulator outlet. The pressure regulator extends into the void between the first surface of the receptacle and the second surface of the receptacle. The pressure regulator includes a third surface surrounding the axis, and a fourth surface surrounding the axis and the third surface. A first seal engages the first surface of the receptacle and the third surface of the pressure regulator and a second seal engages the second surface of the receptacle and the fourth surface of the pressure regulator.

There is also provided a filter module for an automotive fuel supply system including a housing, a filter mounted in the housing, a pressure regulator conduit mounted in the housing, and a fuel pressure regulator. The housing includes a module inlet and a module outlet. The filter is in fluid communication with the module inlet and the module outlet. The pressure regulator conduit includes a regulator inlet in fluid communication with the filter, a receptacle in fluid communication with the regulator inlet, and a regulator outlet extending along an axis into the receptacle. The fuel pressure regulator is sealingly mounted within the receptacle to selectively open and close fluid communication between the regulator inlet and the regulator outlet. The fuel pressure regulator includes a first housing member, a second housing member connected to the first housing member, and a closing member movably contained within the first housing member and the second housing member. The second housing member is in fluid communication with the regulator inlet. The second housing member includes a continuous wall including a base, a recess, an opening in the recess coaxial with the regulator outlet, a seat adjacent the opening, and a second surface. The recess receives the regulator outlet and includes a first surface surrounding the axis. The opening is in fluid communication with the regulator outlet. The seat surrounds the opening and the second surface surrounds the axis and the first surface. The closing member is selectively engageable with the seat to fluidly seal the opening. A first seal engages the regulator outlet and the first seal surface and a second seal engages the receptacle and the second surface.

BRIEF DESCRIPTION OF THE DRAWINGS

The accompanying drawings, which are incorporated herein and constitute part of this specification, illustrate an embodiment of the invention, and, together with the general description given above and the detailed description given below, serve to explain the features of the invention.

DETAILED DESCRIPTION OF THE PREFERRED EMBODIMENT

Figure 1:
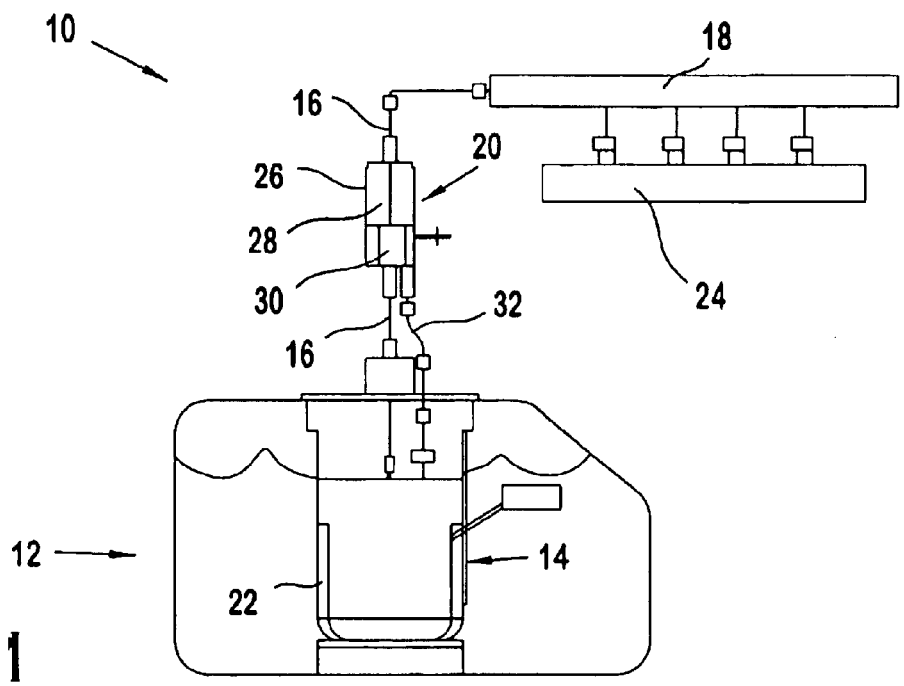
FIG. 1 is a schematic representation of a fuel supply system including a filter module according to a preferred embodiment of the invention.

Referring to FIG. 1, a preferred embodiment of a fuel supply system 10 includes a fuel tank 12, a pump module 14, a fuel line 16, an injector rail 18, and a filter module 20. The pump module 14 includes a pump 22 in fluid communication with the tank 12 and the fuel line 16. The filter module 20 is fluidly connected in the fuel line 16 to filter fuel pumped from the fuel tank 12 through the fuel line 16 by the pump 22. The injector rail 18 can be placed in fluid communication with an internal combustion engine 24.

The filter module 20 includes a housing 26 that contains a filter 28 in fluid communication with the fuel line 16 and a fuel pressure regulator 30 in fluid communication with the filter 28. The pump 22 draws fuel contained in the fuel tank 12 and sends the fuel through the filter 28 and then on to the injector rail 18 by way of the fuel line 16. Fuel sent to the filter 28 is also fed to the fuel pressure regulator 30, which limits the maximum pressure of the fuel sent to the injector rail 18 by selectively opening fluid communication between the filter 28 and a regulator outlet 32, as will be explained in detail below. The regulator outlet 32 is in fluid communication with the fuel pressure regulator 30 and the pump module 14. The regulator outlet 32 returns over-pressurized fuel from the fuel pressure regulator 30 to the pump module 18 for recirculation in the fuel supply system 10 by the pump 22.

The filter 28 and the fuel pressure regulator 30 can be assembled into the fuel supply system 10 by connecting the filter module 20 in the fuel line 16 downstream of the pump module 14 and connecting the regulator outlet 32 to the pump module 14. Thus, the filter module 20 can reduce the process time and the number of components for final assembly of the fuel supply system 10.

Also, the filter module 20 advantageously reduces fuel leakage if the fuel pressure regulator 30 fails. The regulator outlet 32 opens inside the pump module 14. The fuel pressure regulator 30 empties over-pressure fuel into pump module 14 by placing the regulator outlet 32 in fluid communication with the inside of the pump module 14. As will be explained in detail below, the fuel pressure regulator 30 normally blocks fluid communication between the filter 28 and the regulator outlet 32. If the fuel pressure regulator 30 fails, then fluid communication will be open between the filter 28 and the regulator outlet 32. Any fuel that passes through the regulator outlet 32 can be collected in the pump module 14 and can be recirculated by the pump 22 to the filter 28 and then on to the injector rail 18.

Figure 2:
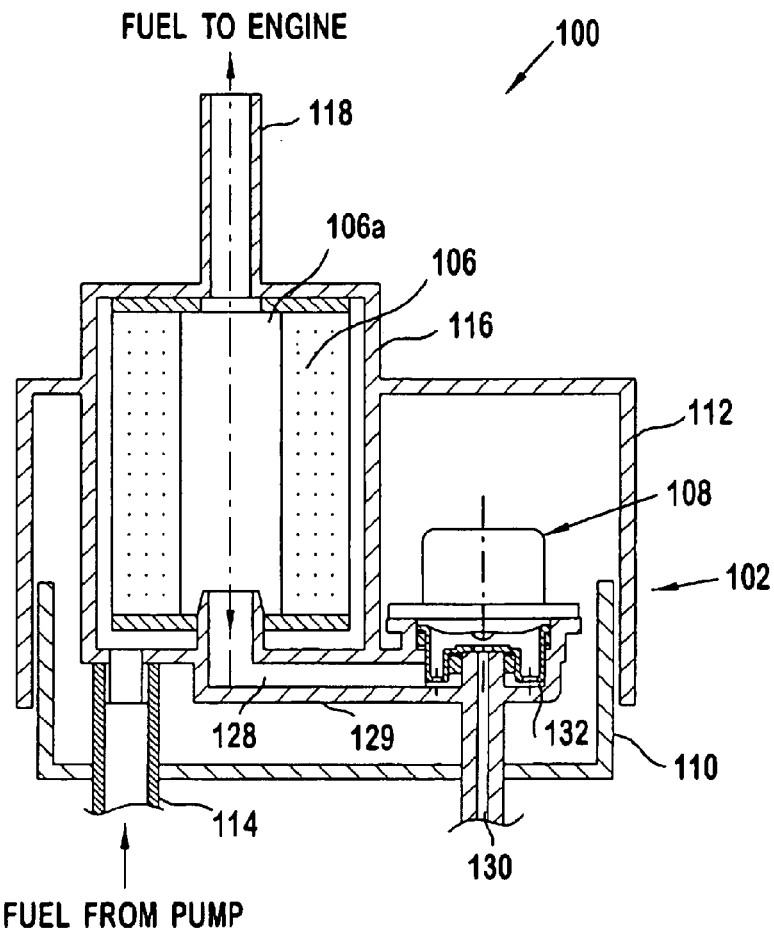
FIG. 2 a cross-sectional view of a pump module according to a preferred embodiment of the invention.

FIG. 2 illustrates a first embodiment of a filter module 100 schematically represented in FIG. 1. The filter module 100 includes a housing 102, which contains a filter 106 and a fuel pressure regulator 108. The housing 102 includes a lower housing 110 and an upper housing 112 connected to the lower housing 110. The lower housing 110 includes a module inlet 114. The upper housing 112 includes a filter housing 116, a module outlet 118 in fluid communication with the filter housing 116, and a mounting flange. The filter 106 is contained in the filter housing 116.

A pressure regulator conduit 124 provides fluid communication between the pump 22, the filter 106 and the pressure regulator 108. The pressure regulator conduit 124 includes a regulator inlet 128, a regulator outlet 130, a receptacle 132. The regulator inlet 128 extends into the filter housing 116 and into a filter passage 106a extending through the filter 106. The receptacle 132 is positioned between and in fluid communication with the regulator inlet 128 and the regulator outlet 130.

Fuel from the tank (not shown) is pumped into the filter housing 116 by way of the module inlet 114 and passes through the filter 106, which removes undesirable debris from the fuel. The fuel then passes into the filter passage 106a where it can exit the filter housing 116 through the module outlet 118 and the regulator outlet 128. The pressure regulator 108 is mounted in the receptacle 132 and normally blocks fluid communication between the regulator inlet 128 and the regulator outlet 130. As will be explained in detail below, the pressure regulator conduit 124 and the pressure regulator 108 are configured to reduce noise and improve pressure regulation performance. A simplified and compact sealing arrangement prevents undesired fuel leakage between the receptacle 132 and the pressure regulator 108, as will be explained in detail below.

Figure 3:
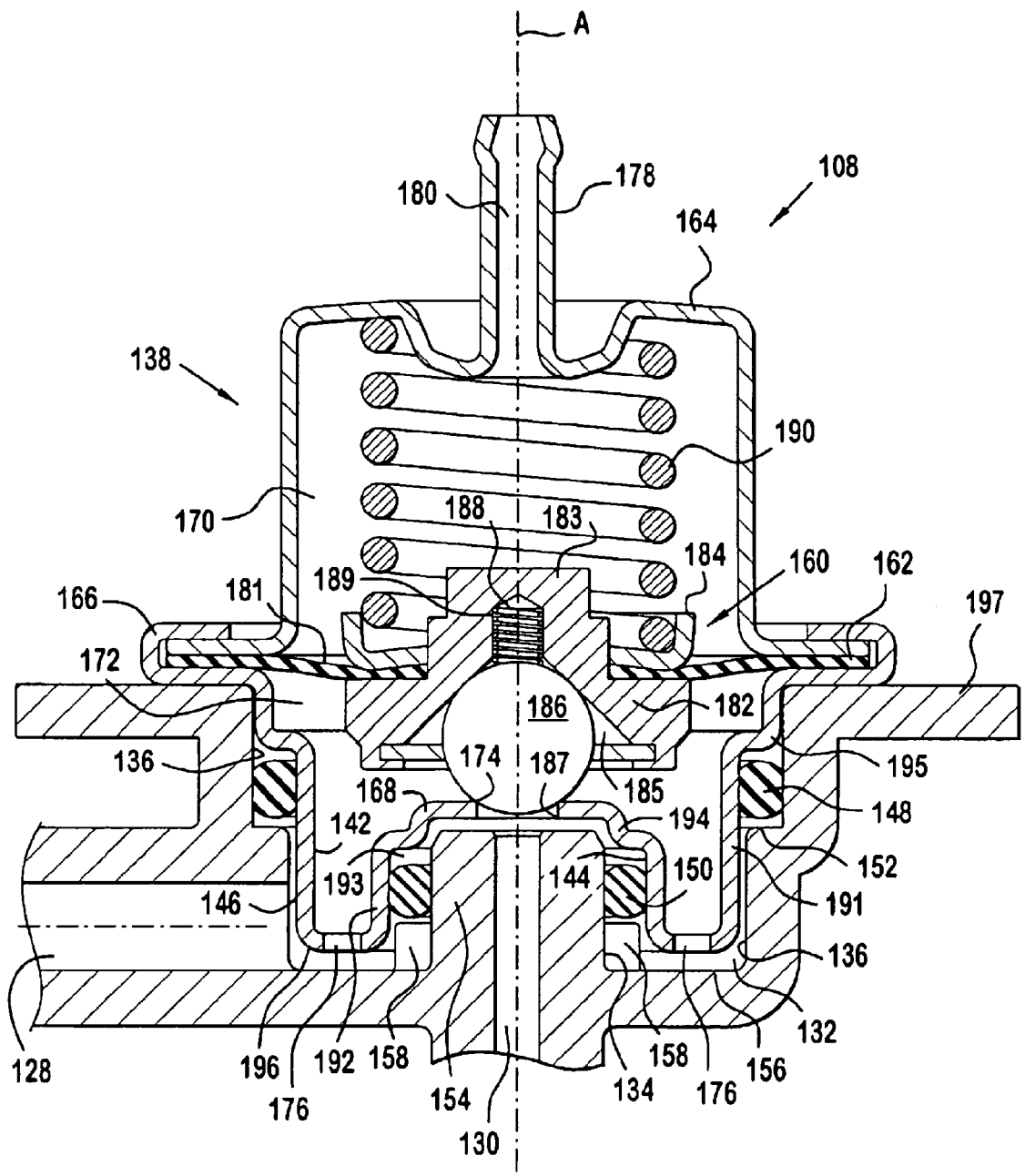
FIG. 3 is an enlarged cross-sectional view of a portion of FIG. 1 and showing the closing member in the closed position.

Referring to FIG. 3, the receptacle 132 includes a central axis A, an first surface 134, and an second surface 136 concentric with the first surface 134 about the central axis A. The first surface 134 faces away from the central axis A and the second surface 136 faces toward the central axis A. The second surface 136 is radially outward of and surrounds the first surface 134.

The fuel pressure regulator 108 is centered about the central axis A and includes a housing 138 having an upper housing 140 and a lower housing 142. The lower housing 142 is cylindrical and includes an third surface 144 and an fourth surface 146 concentric with the third surface 144 about the central axis A. The fourth surface 146 faces away from the central axis A and the third surface 144 faces toward the central axis A and the fourth surface 146 surrounds the third surface 144. The lower housing 142 extends between the second surface 136 of the receptacle 132 and the first surface 134 of the receptacle 132. The fourth surface 146 of the lower housing 142 is spaced from and opposes the second surface 136 of the receptacle 132. The third surface 144 of the lower housing 142 is spaced from and opposes the first surface 134 of the receptacle 132.

The fuel pressure regulator 108 is sealed in the receptacle 132 by an upper seal 148 and a lower seal 150. The upper seal 148 engages the second surface 136 of the receptacle 132 and the fourth surface 146 of the lower housing 142 and seals the space between these surfaces 136, 146. The lower seal 150 engages the first surface 134 of the receptacle 132 and the third surface 144 of the lower housing 142 and seals the space between these surfaces 134, 144. Preferably, the upper seal 148 and the lower seal 150 are O-rings.

Preferably, the second surface 136 of the receptacle 132 is cylindrical and centered about the central axis A. The second surface 136 of the receptacle 132 includes annular shelf 152 that provides a seat for the upper seal 148. Alternatively, the annular shelf 152 can be omitted and the second surface 136 of the receptacle 132 can have a constant diameter along the central axis A.

The receptacle 132 includes a projection 154 extending from the base 156 of the receptacle 132 toward the fuel pressure regulator 108. The first surface 134 of the receptacle 132 is located on the projection 154. Preferably, the projection 154 is cylindrical, centered on the central axis A, and extends approximately perpendicular to the regulator inlet 128. The regulator outlet 130 extends through the projection 154 along the central axis A. An opening in the projection 154 fluidly connects the regulator outlet 130 with the receptacle 132.

The receptacle 132 can include a plurality of blocks 158 formed at the base 156 of the receptacle 132 and adjacent to the projection 154 to provide a seat for the lower seal 150. The blocks 158 can be spaced about the circumference of the projection 154. Alternatively, a single ring can be provided at the base 156 of the receptacle 132 and adjacent to the projection 154 to provide the seat for the lower seal 150.

This seal assembly provides a compact arrangement as measured along the central axis A. Additionally, the retention of the upper seal 148 and the lower seal 150 does not require separate retaining rings to be mounted to the lower housing 142, thus minimizing the number of parts.

The pressure regulator 108 includes a diaphragm assembly 160 within the housing 138 that selectively places the regulator inlet 128 in fluid communication with the regulator outlet 130. The upper housing 140 is cylindrical, opened at one end, and includes a radial flange 162 at the opened end and a top 164 closing the other end. The lower housing 142 is opened at one end and includes a crimping flange 166 at the opened end and a base 168 at the other end. The opened ends of the upper housing 140 and the lower housing 142 are positioned adjacent each other and the diaphragm assembly 160 is crimped between the radial flange 162 and the crimping flange 166. The crimping flange 166 also extends around the radial flange 162 to secure the lower housing 142 to the upper housing 140. The diaphragm assembly 160 divides the interior of the housing 138 into a reference pressure chamber 170 and a fuel pressure chamber 172.

The base 168 of the lower housing 142 includes a valve seat 174 and a plurality of fuel inlets 176 spaced about the circumference of the base 168. The valve seat 174 is aligned with the opening in the projection 154 along the central axis A and spaced from the projection 154 along the central axis A when the fuel pressure regulator 108 is received in the receptacle 132. The fuel inlets 176 are in fluid communication with the fuel pressure chamber 172 and the receptacle 132. A reference pressure inlet 178 extends from the top 164 of the upper housing 140 and includes a cylindrical passage 180 in fluid communication with the reference pressure chamber 170.

The diaphragm assembly 160 includes a flexible annular diaphragm 181 having an third portion crimped between the radial flange 162 and the crimping flange 166 to secure the diaphragm assembly 160 to the housing 138. The inner portion of the diaphragm 181 is crimped between a radial flange 182 of a support member 183 and a retainer plate 184 to secure the diaphragm 181 to the support member 183.

The support member 183 includes a recess 185 that receives a valve closing member 186. Preferably, the valve closing member 186 is a sphere. The base 168 of the lower housing 142 includes an orifice 187 in fluid communication with the opening in the projection 154. Preferably, the orifice 187 centered about the central axis A. The valve closing member 186 mates with the valve seat 174 to seal off the orifice 187 and thereby the regulator outlet 130. The support member 183 includes a bore 188 centered on the recess 185. The bore 188 contains a spring 189 that biasingly engages the valve closing member 186. The interaction of the valve closing member 186 with the recess 185 and the spring 189 ensures that the valve closing member 186 is properly aligned with the valve seat 174 to fluidly seal the regulator outlet 130 from the regulator inlet 128.

A spring 190 between the upper housing 140 and the diaphragm assembly 160 biases the diaphragm assembly 160 into sealing engagement with the valve seat 174 to block the flow of fuel from the fuel inlets 176 to the orifice 187, thus fluidly sealing the regulator outlet 130 from the regulator inlet 128. Fuel entering the fuel inlets 176 applies a pressure to diaphragm assembly 160. When the fuel pressure exceeds a threshold value, the diaphragm assembly 160 lifts off the valve seat 174, against the bias of the spring 190, to open the orifice 187, thus placing the regulator outlet 130 in fluid communication with the regulator inlet 128. The over-pressurized fuel then passes through the regulator outlet 130 and can be collected in a pump module, as schematically shown in FIG. 1, where it can be pumped back to the filter 106.

The spring 190 determines the over-pressure value at which of the fuel pressure regulator 108 operates. This permits a modular design for the regulator 108 in which the spring 190 is the only part of the fuel pressure regulator 108 that needs to be altered to meet different operating parameters. This preferred embodiment approach provides a family of fuel pressure regulators 108 having different pressure control values. The diaphragm 181 can be made from rubber or other elastic material sufficient to withstand the chemical effects of the fuel and provide the requisite elasticity, such as nitrile, fluorocarbon rubber and fluorosilicon rubber. This reduces manufacturing inventory, assembly complexity and cost.

The valve seat 174 is configured to match the shape of the valve closing member 186. Preferably, the valve seat 174 is integrally formed with the base 168 of the lower housing 142. The valve seat 174 can be coined onto the base 168 of the lower housing 142. This construction can permit the valve seat 174 to be provided simultaneously with the formation of the base 168 and then coined in a subsequent process. Thus, it is not necessary to form the valve seat as a separate member and then subsequently secure the valve seat 174 to the lower housing 142. This promotes a minimum number of assembly steps and components for the manufacturing of the regulator 108.

Fuel from the filter 106 enters the regulator 108 through the regulator inlet 128 and applies a pressure against the diaphragm 181. When this applied pressure exceeds the threshold value, called over-pressure, the diaphragm 181 resiliently deflects toward the upper housing 140 to raise the valve closing member 186 off the valve seat 174 (as shown in FIG. 2). Fuel can then escape the from fuel line 16 (FIG. 1) through the regulator outlet 130, thus lowering the fuel pressure in the fuel line 16 (FIG. 1) into the requisite operating pressure range. Thus, the pressure regulator 108 prevents over-pressurized fuel from reaching the injector rail 18 (FIG. 1). By advantageously connecting the regulator outlet 132 to the pump module 14 (FIG. 1), if a component of the fuel pressure regulator 108 should fail, then over-pressurized fuel from the pump 22 can be contained within the pump module 14 (FIG. 1).

It is believed that, generally, the yield strength of the diaphragm 181 is exceeded only under rare over-pressure conditions. This is because the over-pressure in all but these rare over-pressures is sufficiently reduced below the yield strength of the diaphragm 181 when the valve closing member 186 opens the orifice 187 to permit excess fuel to escape the fuel line 14 by way of the regulator outlet 130.

The lower housing 142 includes an outer cylindrical wall 191 extending between the base 168 and the crimping flange 166. The base 168 of the lower housing 142 includes an inner cylindrical wall 192 surrounding a recess 193 centered in the base 168. The projection 154 extends into the recess 193 when the pressure regulator 108 is mounted in the receptacle 132. The third surface 144 of the lower housing 142 is located on the cylindrical face of the inner cylindrical wall 192 and forms a portion of the recess 193. The base 168 is configured to provide the recess 193 with a recess base having a depression and an annular step 194 surrounding the depression.

The lower seal 150 is captured between the annular step 194 and the plurality of blocks 158 when the pressure regulator 108 is mounted in the receptacle 132. By providing the annular step 194 on the base, there it is not necessary to place a additional retainer ring above the lower seal 150 to retain the lower seal 150 in the desired location between the lower housing 142 and the projection 154. Thus, the number of parts for the seal assembly can be reduced.

The outer cylindrical wall 191 of the lower housing 142 includes the fourth surface 146 of the lower housing 142 and an annular step 195 connecting the fourth surface 146 to the crimping flange 166. The upper seal 148 is captured between the annular step 195 and the annular shelf 152 when the pressure regulator 108 is mounted in the receptacle 132.

The base 168 of the lower housing 142 includes an end wall 196 connecting the outer cylindrical wall 191 and the inner cylindrical wall 192. Preferably, the end wall 196 extends radially relative to the central axis A. The fuel inlets 176 extend through and are circumferential spaced about the end wall 196.

The pressure regulator conduit 124 further includes a support flange 197 surrounding the receptacle 132. The crimping flange 166 of the lower housing 142 contacts the support flange 197 when the fuel pressure regulator 108 is mounted in the receptacle 132. The length of the lower housing 142 measured along the central axis A is less then the depth of the receptacle 132 measured along the central axis A. The support flange 197 supports the housing 138 so that the end wall 196 of the lower housing 142 is spaced from the base 156 of the receptacle 132.

The lower housing 142 can be a stamped metal piece in which the crimping flange 166, the base 168, the valve seat 174, and the outer cylindrical wall 191 are integrally formed on the lower housing 142 during the stamping process. In this stamped metal lower housing 142, the opening, the valve seat 174, the fuel inlets 176, the inner cylindrical wall 192, the recess 193, the annular step 194, and the end wall 196 are incorporated into the base 168 and the crimping flange 166 and the annular step 195 are incorporated into the outer cylindrical wall 191. By stamping the lower housing 142 from a single piece of sheet metal, the base 168 and the outer cylindrical wall 191 are incorporated into a continuous housing member to provide the lower housing 142. This can simplify the assembly process by manufacturing because these features can be formed simultaneously by a single stamping process. Further, this integral assembly can reduce the number of parts for assembling the pump module 100

Providing the regulator outlet 130 as a component of the receptacle 132 instead of the housing 138 permits integration of the regulator outlet 130 and the regulator inlet 128 with the receptacle 132. The regulator inlet 128, the regulator outlet 130, the receptacle 132, and the projection 154 can be integrally formed by an injection molding process. This can reduce the cost and the number of parts for assembling the pump module 100. The regulator outlet 130 can be integrally molded in a near net shape or a net shape so that minimal or no further machining will be required.

It is believed that the geometry of the regulator outlet 130 impacts the noise and the pressure regulation performance of the pump module 100. Preferably, the regulator outlet 130 has geometry that reduces noise and improves pressure regulation. In the first embodiment of the pump module 100 illustrated in FIG. 3, the regulator outlet 130 has a constant diameter along the central axis A to provide a straight passage through the extension. Alternatively, other configurations of the regulator outlet 130 are possible, such as that shown in FIG. 4.

Figure 4:
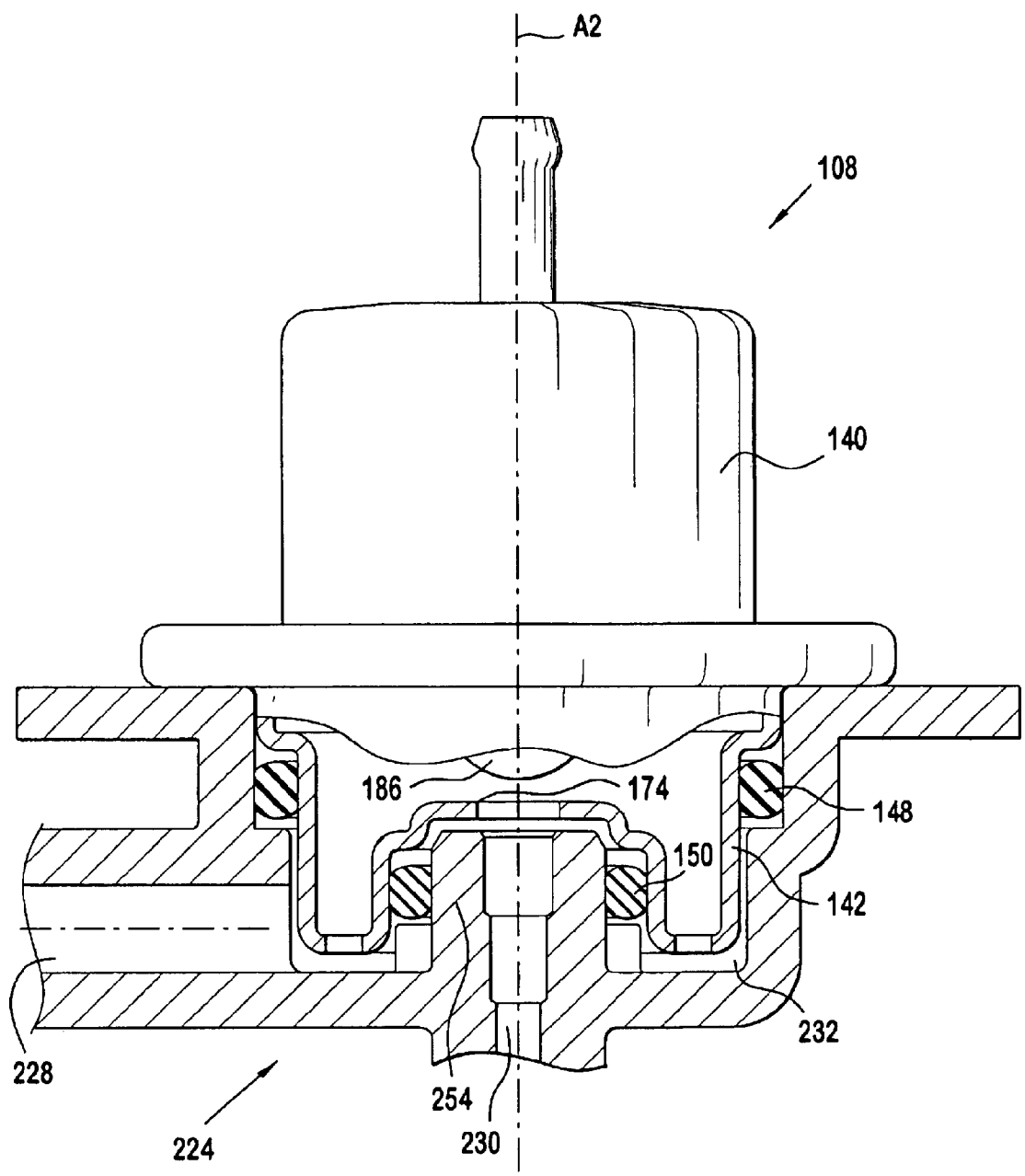
FIG. 4 is a cross-sectional view of a second embodiment of a pressure regulator conduit according to the invention and showing the valve closing member in the opened position.

FIG. 4 illustrates a second embodiment of a regulator conduit 224 that includes a regulator inlet 228, a regulator outlet 230, a receptacle 232, and a central axis A2. The regulator conduit 224 includes a fuel pressure regulator 108 and sealing arrangement as described above with reference to FIGS. 2 and 3. The receptacle 232 is positioned between and in fluid communication with the regulator inlet 228 and the regulator outlet 230. The pressure regulator 108 is mounted in the receptacle 232 and normally blocks fluid communication between the regulator inlet 228 and the regulator outlet 230. The regulator conduit 224 is configured to reduce noise and improve pressure regulation performance.

The receptacle 232 includes a projection 254 and the regulator outlet 230 extends through the projection 254. The regulator outlet 230 is tapered and preferably includes three sequentially decreasing stepped diameters. The stepped diameters decrease in size in the direction along the central axis A2 away from the lower housing 142 of the fuel pressure regulator 108. Alternatively, the bore of the regulator outlet 230 can have any number of stepped diameters greater than two. In a further alternate embodiment, the bore of the regulator outlet 230 can have a smooth taper along the central axis A2.

As with the first embodiment of FIGS. 2 and 3, providing the regulator outlet 230 as a component of the receptacle 232 instead of the housing 138 permits integration of the regulator outlet 230 and the regulator inlet 228 with the receptacle 232. The regulator inlet 228, the regulator outlet 230, the receptacle 232, and the projection can be integrally formed by an injection molding process. This can reduce the cost and the number of parts for pump module 100. The regulator outlet 230 can be integrally molded in a near net shape or a net shape so that minimal or no further machining will be required.

In comparing the embodiments of the fuel pressure regulator assembly of FIGS. 3 and 4, it is apparent that integration of the regulator outlet 130, 230 with the receptacle 132, 232 permits a modular assembly where different noise suppression requirements can be met without modification to the fuel pressure regulator 108. Instead, the geometry of the regulator outlet 130, 230 can be configured to provide the requisite noise suppression. This provides for a modular approach to the pump module 100 where a common fuel pressure regulator 108 can be combined with various configurations of the regulator outlet 130, 230 to meet various noise suppression requirements. This also can reduce manufacturing overhead because the number of different fuel pressure regulators 108 can be minimized without compromising noise suppression capabilities.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What we claim is:

1. A filter module for an automotive fuel supply system comprising:
    a housing including a module inlet and a module outlet;
    a filter mounted in the housing and in fluid communication with the module inlet and the module outlet;
    a pressure regulator conduit mounted in the housing and including a regulator inlet in fluid communication with the filter, a regulator outlet, and a receptacle in fluid communication with the regulator inlet and the regulator outlet, the receptacle including a first surface surrounding an axis, and a second surface surrounding the axis and the first surface to provide a void between the first surface and the second surface;
    a pressure regulator mounted in the receptacle to selectively open fluid communication between the regulator inlet and the regulator outlet, the pressure regulator extending into the void between the first surface of the receptacle and the second surface of the receptacle, the pressure regulator including a third surface surrounding the axis, and a fourth surface surrounding the axis and the third surface;
    a first seal engaging the first surface of the receptacle and the third surface of the pressure regulator; and
    a second seal engaging the second surface of the receptacle and the fourth surface of the pressure regulator.

2. The filter module according to claim 1, wherein the filter comprises a filter passage in fluid communication with the module outlet and the regulator inlet, the regulator inlet includes a first end extending into the filter passage and a second end extending away from the filter, and the receptacle is proximate the second end of the regular inlet.

3. The filter module according to claim 1, wherein the pressure regulator further comprises a base including a recess and a face extending radially relative to the axis, the face including a fuel inlet in fluid communication with the regulator inlet;
    the receptacle further includes a projection extending along the axis and into the recess, the regulator outlet extends through the projection; and
    the first seal being intermediate the second seal and the radial face along the axis.

4. The filter module according to claim 1, wherein the third surface of the pressure regulator includes an annular step extending toward the axis;

the receptacle further includes a base and a seal seat extending from the first surface of the receptacle and adjacent the base;

the first seal is intermediate the seal seat and the annular step of the third surface; and the fourth surface includes an annular step extending away from the axis, and the second seal is located adjacent the annular step of the fourth surface.

5. The filter module according to claim 4, wherein the seal seat comprises a plurality of blocks spaced about the perimeter of the first surface of the receptacle.

6. The filter module according to claim 1, wherein the regulator outlet has a constant diameter along the axis sized to minimize noise as fuel passes through the outlet.

7. The filter module according to claim 1, wherein the regulator outlet has a diameter that decreases in discrete steps along the axis in a direction away from the pressure regulator to minimize noise as fuel passes through the outlet.

8. The filter module according to claim 1, wherein the module inlet comprises an inlet in direct fluid communication with the filter.

9. A filter module for an automotive fuel supply system comprising:

a housing including a module inlet and a module outlet;

a filter mounted in the housing and in fluid communication with the module inlet and the module outlet;

a pressure regulator conduit mounted in the housing and including a regulator inlet in fluid communication with the filter, a receptacle in fluid communication with the regulator inlet, and a regulator outlet extending along an axis into the receptacle; and a fuel pressure regulator sealingly mounted within the receptacle to selectively open and close fluid communication between the regulator inlet and the regulator outlet, the fuel pressure regulator including:

a first housing member, a second housing member and connected to the first housing member and in fluid communication with the regulator inlet, the second housing member including a continuous wall, the continuous wall including:

a base;

a recess in the base and receiving the regulator outlet, the recess including a first surface surrounding the axis, an opening in the recess coaxial with the regulator outlet and in fluid communication with the regulator outlet;

a seat adjacent the opening and surrounding the opening; and a second surface surrounding the axis and the first surface; and a closing member movably contained within the first housing member and the second housing member and selectively engageable with the seat to fluidly seal the opening;

a first seal engaging the regulator outlet and the first surface; and a second seal engaging the receptacle and the second surface.

10. The filter module according to claim 9, wherein the filter comprises a filter passage in fluid communication with the module outlet and the regulator inlet, the regulator inlet includes a first end extending into the filter passage and a second end extending away from the filter, and the receptacle is proximate the second end of the regulator inlet.

11. The filter module according to claim 9, wherein the pressure regulator further comprises:

a diaphragm assembly connected between the first housing member and the second housing member, the diaphragm assembly including the closing member; and a fuel pressure chamber housed by the diaphragm assembly and the second housing member.

12. The filter module according to claim 11, wherein the second housing further comprises a stamped metal cylindrical housing;

the base includes an annular wall portion encircling the recess and a radial wall portion connecting the first surface and the second surface, and a fuel inlet extends through the radial face and is in fluid communication with the fuel pressure chamber.

13. The filter module according to claim 12, wherein the first seal is intermediate the second seal and the radial face along the axis and the base includes an annular step radially spaced from the opening arid adjacent the first seal to retain the first seal.

14. The filter module according to claim 13, wherein the second housing member comprises a stamped metal housing; and the seat includes a coined seat complimentary in shape to the closing member.

15. The filter module according to claim 14, wherein the closing member comprises a spherical body.

16. The filter module according to claim 9, wherein the regulator outlet comprises a passage having one of a straight configuration and a stepped configuration such that noise is reduced when fuel flows through the passage.

* * * * *